April 18, 1933. R. G. STANDERWICK 1,904,557
ELASTIC FLUID TURBINE
Filed Aug. 28, 1929
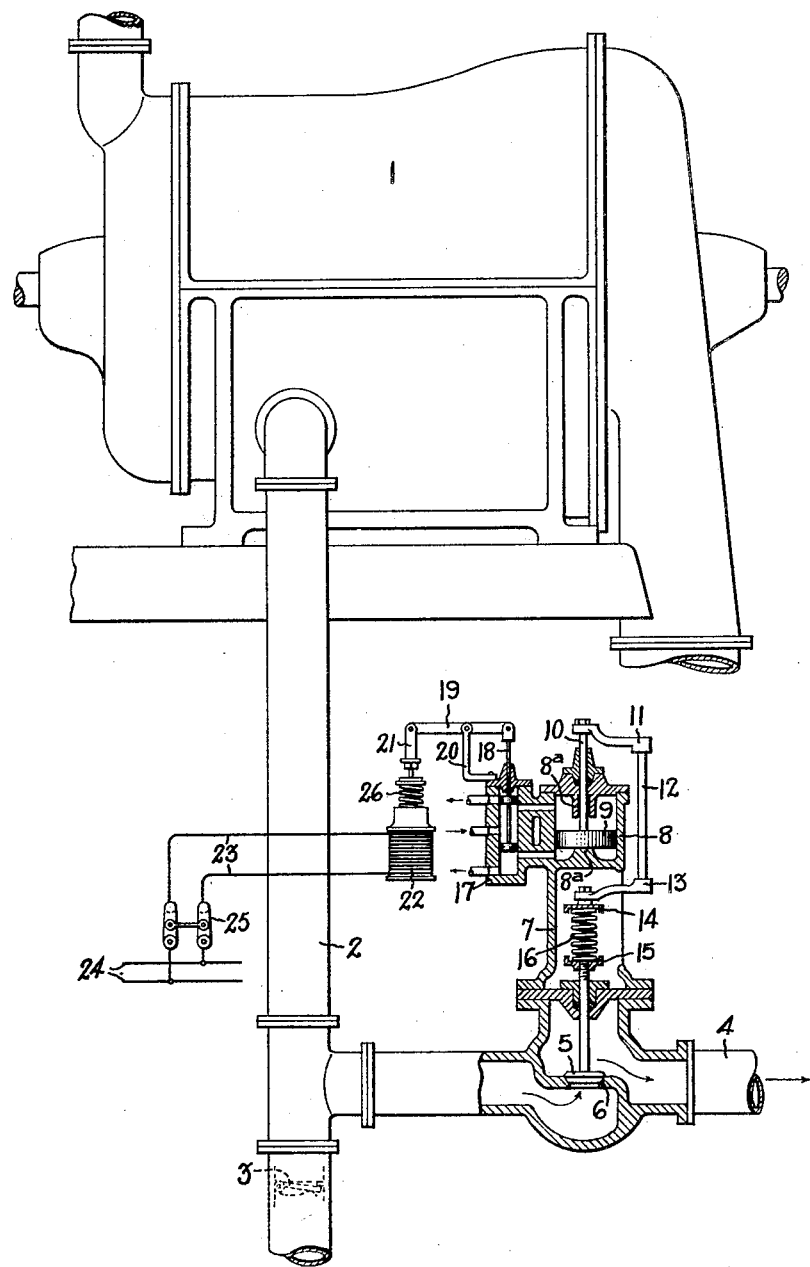
Inventor:
Reginald G. Standerwick,
by Charles V. Tullar
His Attorney.

Patented Apr. 18, 1933

1,904,557

UNITED STATES PATENT OFFICE

REGINALD G. STANDERWICK, OF MARBLEHEAD, MASSACHUSETTS, ASSIGNOR TO GENERAL ELECTRIC COMPANY, A CORPORATION OF NEW YORK

ELASTIC FLUID TURBINE

Application filed August 28, 1929. Serial No. 389,051.

The present invention relates to elastic fluid turbines, wherein elastic fluid is extracted from a stage of higher pressure, for example, the first stage, for heating or industrial purposes. With such turbines, it is desirable in some instances to provide, in connection with the extraction conduit a branch conduit containing a valve whereby the extraction conduit may be connected directly to atmosphere or other region of lower pressure. Such a valve is termed a dumping valve, and is utilized for emergency operation in case it is desired to load the turbine independently of the demand for extraction elastic fluid. In ordinary extraction turbines the mechanical load output of the turbine is determined by the demand for extraction fluid, that is, if the demand for extracted elastic fluid increases, the mechanical load output of the turbine will automatically increase. With an ordinary arrangement it is not possible to change the mechanical load output of the turbine independently of the extracted elastic fluid. It is already known to change the mechanical load output without causing a change of the amount of elastic fluid extracted for industrial purposes by the provision of a dumping valve. With the arrangement of such a valve the turbine may be loaded irrespective of the demand for extracted elastic fluid. The amount of steam passed through the extraction conduit which is not needed for industrial purposes in this case is dumped through the valve to the atmosphere or to any other suitable point. Also, it is desirable to provide in connection with the extraction conduit a pressure relief valve which opens automatically in case the pressure exceeds a predetermined high value, such a pressure relief valve being provided in order to protect the turbine from excessive pressure.

The object of the present invention is to provide, in connection with an elastic fluid turbine, a single valve structure which functions both as a dumping valve and as a pressure relief valve, and for a consideration of what I believe to be novel and my invention, attention is directed to the following specification and the claims appended thereto.

In the drawing, the figure is a diagrammatic view partly in section, of an elastic fluid turbine provided with a valve structure embodying the invention.

Referring to the drawing, 1 indicates an elastic fluid turbine which may be of any suitable construction and which is provided with an extraction conduit 2 connected with a higher pressure stage of the turbine. For example, it may be connected with the first stage. In conduit 2 is a non-return valve 3 of suitable construction which serves to prevent flow of elastic fluid through conduit 2 toward the turbine. Connected to conduit 2, in advance of non-return valve 3, is a branch conduit 4, which leads to atmosphere or other region of lower pressure. In conduit 4 is an unbalanced valve 5 which engages a valve seat 6, and which functions both as a dumping valve and as a pressure relief valve. Carried by the casing of valve 5 is a frame 7 on the upper end of which is a cylinder 8. In cylinder 8 is a piston 9 having a stem 10 on the upper end of which is an arm 11. Movement of the piston in the cylinder is limited by the upper and lower stops 8ª. Arm 11 is connected by rod 12 to a lower arm 13. The end of arm 13 is directly above the stem of valve 5. Located between a spring holder 14 on the end of arm 13 and a spring holder 15 on the end of the stem of valve 5 is a spring 16 which acts in a direction to hold valve 5 against its seat. The spring holder 15 is adjustable on the stem of valve 5, whereby the tension of spring 16 may be adjusted. Adjustment of the spring holder 15 permits the valve 5 to open at the desired steam pressure in conduit 4 as regards the operation of the valve as a relief valve. Connected to cylinder 8 is a pilot valve structure 17 which controls the admission of actuating fluid to cylinder 8 in the well understood manner and which has its stem 18 connected to one end of a lever 19. Lever 19 is pivotally mounted on an arm 20, and its other end is connected by a link 21 to the plunger of an electro-magnet 22. The winding of electro-magnet 22 is connected by connections 23 to a suitable source of electrical energy 24, the connections including a switch 25. 26 is a spring which operates on link 21 in opposition to the pull of electro-magnet 22 and tends to turn lever 19 in a clockwise direction whereby it lowers the pilot valve.

When switch 25 is closed, the electro-magnet is energized, whereby the plunger is pulled downward against the action of spring 26, and the pilot valve is moved to the position shown in the drawing, wherein it admits actuating fluid to cylinder 8 on the upper side of piston 9, and permits it to escape from the lower side. The piston is thus held in the position shown in the drawing wherein it engages lower stop 8ª, spring 16 being placed under compression to hold valve 5 yieldingly on its seat. Valve 5 is unbalanced, the lower side being subjected to the pressure in extraction conduit 2, while the upper side is subjected to atmosphere pressure or a pressure corresponding to that in the region to which conduit 4 is connected. Valve 5 now functions as a pressure relief valve, and in the case of excess pressure will be forced open against the action of spring 16 to relieve the pressure in conduit 2.

In case it is desired to open valve 5 so as to connect conduit 2 to atmosphere or other region of lower pressure for the purpose of loading up the turbine independently of the extraction conduit, switch 25 is opened, thereby de-energizing electro-magnet 22. Spring 26 then forces the left hand end of lever 19 upward and the right hand end downward, thereby lowering the pilot valve to connect cylinder 8 beneath piston 9 to the source of fluid pressure controlled by the pilot valve, the upper side of the piston being then connected to the upper discharge pipe of the pilot valve. The fluid pressure acting on the lower side of piston 9 raises the piston into engagement with upper stop 8ª, thereby lifting arm 13 and relieving the pressure on spring 16. Pressure in conduit 2 thereupon opens valve 5, connecting conduit 2 directly to atmosphere or other region of lower pressure by way of the conduit 4. Non-return valve 3 now functions to prevent flow of elastic fluid through conduit 2 toward the turbine.

From another viewpoint, I provide in combination with an elastic fluid turbine having a conduit for extracting fluid a combined pressure relief and dumping valve comprising an unbalanced valve, a spring and means for adjusting the spring to permit the relieving of elastic fluid at different pressures, and furthermore other means independent of the first named adjusting means for temporarily modifying the action of the first named adjusting means to cause dumping of elastic fluid from the conduit.

It will thus be seen that by my invention I provide a single valve which functions as both a pressure relief valve and a dumping valve. At the same time, the valve is simple in structure and reliable in operation.

What I claim as new and desire to secure by Letters Patent of the United States, is:

1. The combination with an elastic fluid turbine, a conduit connected to a stage of the turbine for tapping steam therefrom, a non-return valve in said conduit, and a branch conduit connected to said first-named conduit in advance of said non-return valve, of a combined dumping and pressure relief valve in said branch conduit comprising a valve casing having a seat, an unbalanced valve adapted to engage the seat, a yieldable spring for holding the valve on its seat, means for adjusting the spring, a movable arm for holding said spring under compression, a fluid actuated motor to which said arm is connected, a pilot valve for said motor, and means for moving said pilot valve to control the admission of actuating fluid to said motor for modifying the action of the spring adjusting means.

2. The combination with an elastic fluid turbine having a conduit connected to an intermediate stage for tapping steam therefrom, of a combined dumping and pressure relief valve in said conduit comprising a valve casing having a seat, an unbalanced valve adapted to engage said seat, a spring normally holding the valve on its seat, means for adjusting the spring, movable means for holding said spring under compression, and means independent of the spring adjusting means for effecting movement of said movable means to relieve the compression on the spring.

3. The combination with an elastic fluid turbine having a conduit connected to an intermediate stage for tapping steam therefrom, of a combined dumping and pressure relief valve in said conduit comprising a valve casing having a seat, an unbalanced valve adapted to engage said seat, a stem for the valve which projects outside the valve casing, a movable arm, a spring located between the end of the stem and said arm, means for adjusting the spring, and a fluid acuated motor for moving said arm to place the spring under compression and modifying the action of the spring adjusting means for dumping the fluid from the conduit.

4. The combination with an elastic fluid turbine having a conduit connected to an intermediate stage for tapping steam therefrom, of a combined dumping and pressure relief valve in said conduit comprising a valve casing having a seat, an unbalanced valve adapted to engage said seat, a stem for the valve which projects outside the valve casing, a movable arm, a spring located between the end of the stem and said arm, means for adjusting the spring, a fluid actuated motor connected to said arm to modify the action of the spring adjusting means, and electromagnetically operated means for controlling said fluid actuated motor.

5. The combination with an elastic fluid turbine having a conduit to an intermediate stage for tapping steam therefrom, of another conduit connected to said first named conduit, an unbalanced valve means provided in said other conduit, a spring member and means for adjusting the member for normally biasing said valve means to closed position and to permit opening of said valve means if the pressure of a fluid passed through said first named conduit exceeds a predetermined value whereby said valve means is adapted to operate as a relief valve, and means independent of the first named adjusting means including an electromagnetic means for relieving said spring member to prevent said spring member from biasing said valve means to closed position whereby said valve means may be operated as a dumping valve.

6. The combination with an elastic fluid turbine, a conduit for extracting fluid therefrom having a valve therein for preventing return flow of fluid, and a branch conduit in communication with said first mentioned conduit between the turbine and the valve, of a combined relief and dumping valve for the branch conduit including an unbalanced valve, adjustable means for biasing said valve towards closed position and auxiliary means for temporarily modifying the action of said first mentioned means to dump the fluid from said fluid extracting conduit.

7. The combination with an elastic fluid turbine, a conduit for extracting fluid therefrom having a valve therein for preventing return flow of fluid, and a branch conduit in communication with said first mentioned conduit between the turbine and the valve, of a combined relief and dumping valve for the branch conduit including an unbalanced valve, an adjustable means for biasing said valve towards closed position, and means operable independently of the adjustable means for opening said valve.

8. The combination with an elastic fluid turbine, a conduit for extracting fluid therefrom having a valve therein for preventing return flow of fluid, and a branch conduit in communication with said first mentioned conduit between the turbine and the valve, of a combined relief and dumping valve for the branch conduit including an unbalanced valve, adjustable means for biasing said valve towards closed position and means operable independently of the adjustable means for modifying the action of said adjustable means to dump fluid from the fluid extracting conduit.

In witness whereof, I have hereunto set my hand this 26th day of August, 1929.

REGINALD G. STANDERWICK.